United States Patent
Spielbauer et al.

(10) Patent No.: US 6,363,083 B1
(45) Date of Patent: Mar. 26, 2002

(54) BILEVEL NODE IDENTIFIERS IN CONTROL AREA NETWORK (CAN) PROTOCOL

(75) Inventors: Hans-Kilian Josef Spielbauer; Martin Georg Walter Hnida, both of Berlin (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/267,960

(22) Filed: Mar. 12, 1999

(51) Int. Cl.[7] .................................................. H04J 3/24
(52) U.S. Cl. ...................................... 370/470; 370/475
(58) Field of Search ................................ 370/389, 390, 370/392, 393, 465, 466, 470, 471, 472, 473, 474, 475, 410, 409

(56) References Cited

U.S. PATENT DOCUMENTS

| | | | |
|---|---|---|---|
| 4,926,420 A | * | 5/1990 | Shimizu ..................... 370/471 |
| 5,202,540 A | | 4/1993 | Auer et al. |
| 5,387,769 A | | 2/1995 | Kupersmith et al. |
| 5,469,150 A | | 11/1995 | Sitte |
| 5,854,454 A | | 12/1998 | Upender et al. |

* cited by examiner

*Primary Examiner*—Kwang B. Yao

(57) ABSTRACT

The 29 bit identifier field of a standard CAN protocol message format is subdivided into a message function portion, a class one node identifier portion, to identify class one nodes which must be able to communicate with each other as well as with a large number of other nodes in the system, and a selectable node identifier portion, the vast majority of which is utilized for class two node identifiers, to identify class two nodes which never need to communicate with each other, but only need to communicate with class one nodes, and a small portion of which is utilized for class one node identifiers for cases where two class one nodes are communicating with each other. The least significant eight bits of the selectable portion represent class one identifiers when the most significant eight bits of the selectable portion are all zeros, but when any of the most significant eight bits of the selectable portion represents a one, then the lowest ordered eight bits are part of a class two identifier. Thus, the selectable portion can identify, for example, 256 class one nodes and 65,280 class two nodes.

8 Claims, 2 Drawing Sheets

BILEVEL NODE IDENTIFIERS IN CONTROL AREA NETWORK (CAN) PROTOCOL

TECHNICAL FIELD

This invention relates to an extension of the Control Area Network (CAN) message protocol to provide routing of messages in an elevator control communication network having up to tens of thousands of nodes.

BACKGROUND ART

It is well known that elevator systems employing multiple elevators typically will have a plurality of elevators arranged in a group, there being several groups within the building. Communication among all the nodes, including nodes on each car, nodes in a group controller and nodes in the building, may be accomplished with a single communications protocol by means of communications coprocessors each having a transmitter and a receiver.

Such systems require a significant amount of communications hardware. Therefore, use of industry standard, readily available, low-cost hardware would be an advantage.

A recent innovation in local area networks is the Control Area Network (CAN) standard, the basic level of which is identified in ISO 11898 and ISO 11519-1. The CAN standard was originally developed to satisfy distributed real-time control needs in automotive applications. As a result, several manufacturers provide very low cost CAN chips which conform to the protocol.

In the CAN protocol, the same identifier field is filtered by each receiving node to determine its interest in any given message. Messages that pass through the filter are received and those that do not are ignored. The CAN protocol is a broadcast type system, where messages are simply laid on the bus, and those receiving nodes which should receive any given messages has filtering adjusted accordingly. Therefore, the number of receiving nodes which can be distinguished by the CAN protocol is limited by the number which may be represented in the identifier field. The CAN protocol identifier field is limited to 11 bits in one format and is limited to 29 bits in another format. Obviously, an 11 bit format limiting the maximum number of distinguished messages to about 2,000 would be woefully inadequate in an elevator application, which typically has as many as tens of thousands of nodes. A protocol useful in an elevator control system must include source and destination identification, which means that two separate identifiers have to be accommodated within the 29 bit identifier field of the CAN protocol. Furthermore, a protocol useful in an elevator control system must have several priorities and network service types accommodated by the identifier field as well. If these are accommodated in a function field of, for instance, five bits, that would leave 24 bits for source node identification and destination node identification; that results in 12 bits to distinguish the various nodes, limiting the system to about 4,000 nodes, which is seriously inadequate.

Examples of elevator control systems which may utilize local area control networks are in commonly owned U.S. Pat. Nos. 5,387,769 and 5,202,540, and an example of an extended CAN protocol message format for use in such systems is illustrated in commonly owned U.S. Pat. No. 5,854,454.

DISCLOSURE OF INVENTION

Objects of the invention include provision of a CAN protocol which will support communications between as many as tens of thousands of nodes, with messages having different functions, and improvements in a CAN protocol for use with elevator systems.

This invention is predicated in part on our discernment that an elevator control system has a relatively small number of nodes which must be able to communicate with each other as well as communicating with a large number of all of the remaining nodes of the system, and there is a second class of nodes, each of which never has to communicate with any of the other nodes in that class, but only have to communicate with nodes of the first class. Thus, the identities of the second class of nodes need never appear in the same message as both a source node identification and a destination node identification.

According to the present invention, a message protocol adapted for use with standard CAN hardware utilizes one portion of the identifier field to identify a first class of nodes, each of which needs to communicate with a substantial number of all of the other nodes of the system, and a second portion of the identifier field to identify a second class of nodes, each of which never has to communicate with another node of said second class, but only needs to communicate with nodes of said first class, said second portion including a sub portion identifying nodes of said first class when the remainder of said second portion has binary bits all of the same binary value, and a message function portion of said identifier field which identifies, among other things, whether each node identifier is identifying the node as a source or a destination. The invention has several aspects. First, it separates the nodes into two classes, a first one of which can identify nodes of the same class as source and destination node in a singular message, and a second class of nodes which never communicate with each other and therefore the identifiers for which will never appear as both source node and destination node in the same message. This permits use of a majority fraction of the identifier field to identify a very large number of nodes of said second class. Second, the invention eliminates allocating portions of the identifier field as source node identifiers and destination node identifiers and instead utilizes far less bit capacity to designate either of the node identification portions as identifying a source node or a destination node. Third, the invention utilizes a small portion of what might otherwise be the second class node identification portion to identify nodes of the first class, when communication is between two nodes of the first class. The invention accommodates use of standard CAN hardware in control systems, such as elevator control systems, in which there are tens of thousands of nodes that do not communicate with each other.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
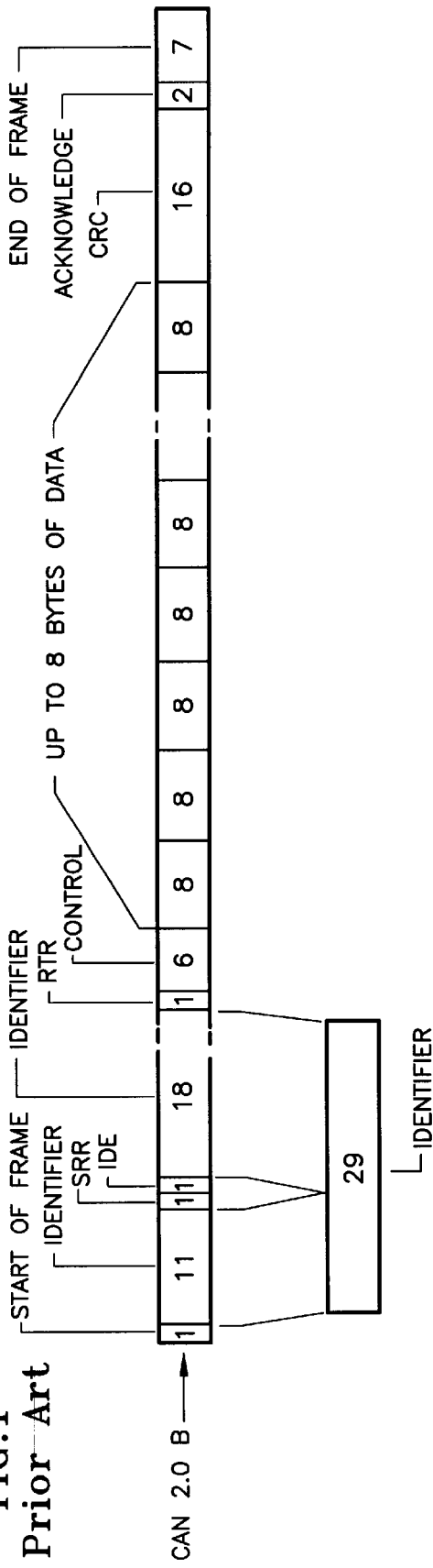
FIG. 1 is a diagram of a standard CAN 2.0 protocol message format known to the prior art.
Figure 2:
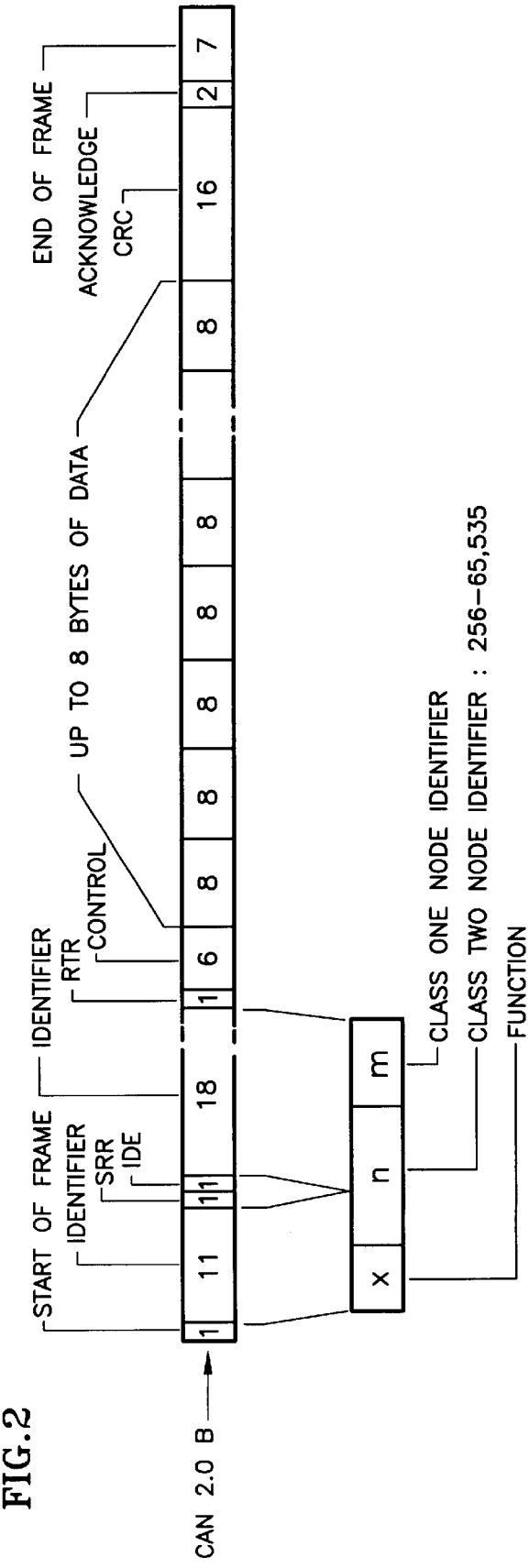
FIG. 2 is a diagram of a CAN 2.0 protocol message format modified according to the present invention in the case where communication is between a class one node and a class two node.
Figure 3:
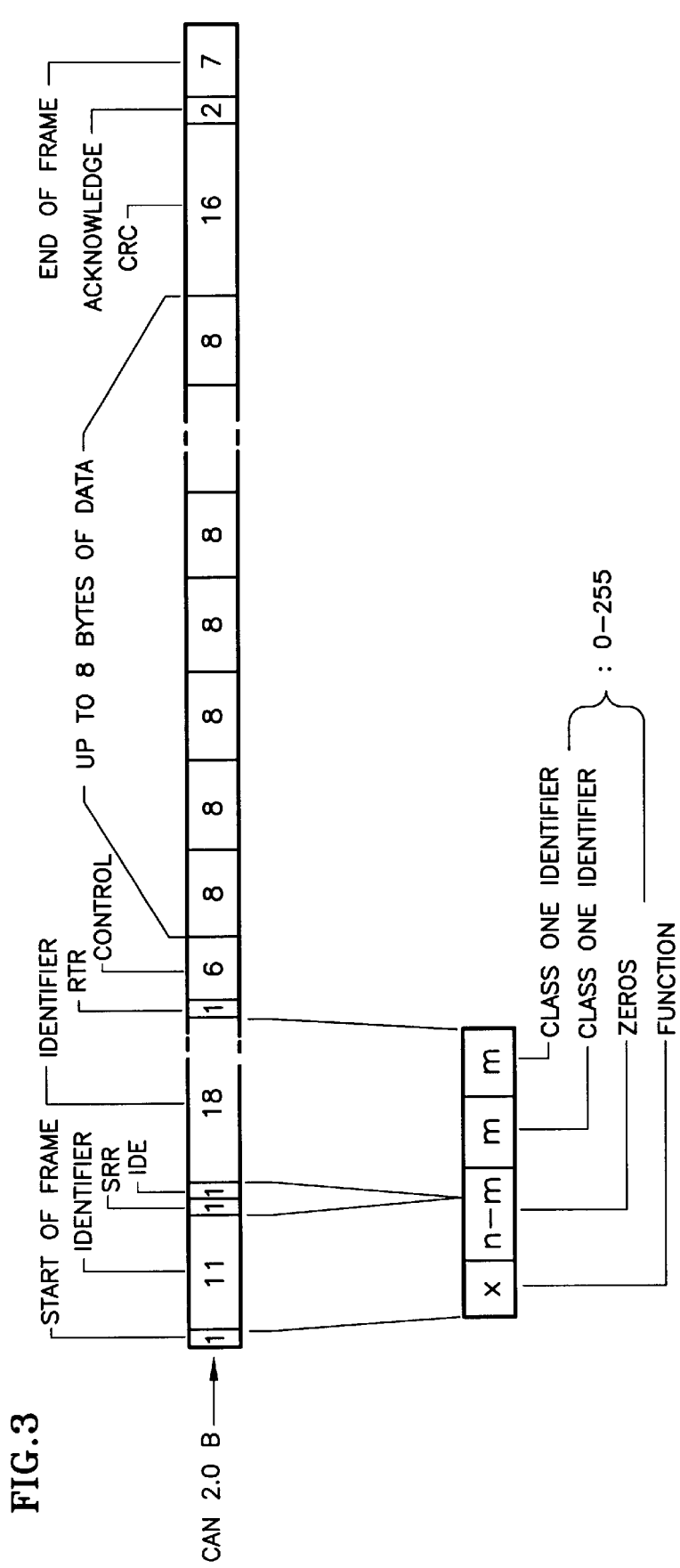
FIG. 3 is a diagram of a CAN 2.0 protocol message format modified by the present invention in the case where communication is between two class one nodes.

Referring to FIG. 1, the standard CAN 2.0 protocol message format includes an 11 bit identifier field and an 18 bit identifier field, which together combine to make a 29 bit identifier field. In FIG. 2, the CAN 2.0 protocol message format is modified, particularly for use in elevator control systems, to divide the 29 bit identifier field into three portions: x bits as a message function field, which will include a designation of which of the other two portions of the 29 bit identifier field is a source node identifier, and which of those portions represents a destination node identifier. In one embodiment, the function portion may contain five bits. A second portion of n bits is a class two node identifier portion, identifying one of the large number of nodes in the system which never have to communicate with each other. In one embodiment, the class two identifier portion contains 16 bits. The third portion of m bits is a class one node identifier portion, identifying one of a number of class one nodes which have to communicate with each other as well as with class two nodes. In one embodiment, the class one node identifier portion contains eight bits. In FIG. 2, the class two node identifier is not entirely devoted to identifying class two nodes, the least significant eight bits of that field will, when two class one nodes are communicating with each other, identify one of the class one nodes. As seen in FIG. 3, when the most significant eight bits of the class two node identifier portion is all zeros (in one embodiment), then the least significant eight bits of the class two node identifier portion identify a class one node. For that reason, the portion of the 29 bit identifier field which includes the class two node identifiers is referred to herein as a selectable portion. Use of the least significant bits of the selectable portion to identify a class one node allows extremely greater numbers to be available for identifying class two nodes. For instance, taking out 256 class one node identifiers from the selectable portion leaves 65,280 class two node identifiers.

Instead of all zeros as in FIG. 3, the high order portion of the selectable identifier portion could be set to all ones to indicate that the least significant 8 bits comprise a class one identifier. In such a case, the class one identifier would be the highest ordered numbers (that is, between 65,280 and 65,535) of the selectable portion. The invention may be practiced either way, as is desired in any case. Thus, the high order sub-portion of the selectable portion, marked "n–m" in FIG. 3 might be all ones instead of all zeroes, and still implement the present invention. As described, in one embodiment, x is five, n is 16 and m is 8. Another useful embodiment for elevators might have x equal 4, n equal 15, and m equal 10. This would permit having over 1,000 class one nodes and over 31,000 class two nodes, with 16 function types. Of course, other numbers may be selected as desired to suit any implementation of the present invention.

The function portion of the 29 bit identifier field should be represented by the most significant bits of the identifier field in order to allow using one or more of the most significant bits in the identifier field to establish the priority level of messages, which in turn allows that priority to be effected by means of the standard CAN collision protocol, which is a bitwise comparison from most significant to least significant, with zero value winning over a value of one. The order in which the class one identifier portion and the selectable portion which identifies both class one nodes and class two nodes is irrelevant.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of communicating between various nodes of a multi-processor control system which has a plurality of class one nodes, each of which must communicate with other ones of said class one nodes and with nodes of said control system other than said class one nodes, and which has a plurality of class two nodes each of which needs to communicate with at least one of said class one nodes but none of which needs to communicate with other ones of said class two nodes, utilizing control area network (CAN) hardware which responds to a standard CAN message format in which the most significant bit is a start of frame bit, the next 31 most significant bits include a 29-bit identifier field, the next bit comprises a remote transmission request bit, the next six bits comprise a field of control bits, the next field of between 0 and 64 bits comprises a data field, the next 16 bits comprise a cyclic redundancy check field, the next 2 bits comprise an acknowledge field, and the least significant seven bits comprise an end of frame field, which method comprises:

providing a message function-type portion consisting of a contiguous fraction of said CAN identifier field including the most significant bits of said identifier field, the content of which will identify other bits of said identifier field as a destination node identifier or a source node identifier, respectively;

providing a class one node identifier portion, consisting of a contiguous fraction of said CAN identifier field, the content of which comprises a class one node identifier which identifies one of a plurality of said class one nodes;

providing a selectable node identifier portion consisting of a contiguous fraction of said CAN identifier field other than said message function-type portion and said class one node identifier portion, the content of which comprises either, when communication is between one of said class one nodes and one of said class two nodes a class two node identifier which identifies one of said plurality of class two nodes.

2. A method according to claim 1 wherein the number of bits in said class two node identifier is greater than the number of bits in said class one node identifier.

3. A method according to claim 2 wherein the number of bits in said class two node identifier is twice the number of bits in said class one node identifier.

4. A method according to claim 1 wherein said selectable node identifier portion, when communication is between two of said class one nodes, comprises a node indicator sub-portion and a class one node identifier.

5. A method according to claim 4 wherein said same binary value is zero.

6. A method according to claim 4 wherein said class one node identifier sub-portion of said selectable node identifier portion comprises the least significant bits of said selectable node identifier portion.

7. A method according to claim 4 wherein said node indicator portion comprises a set of contiguous binary bits all having the same binary value.

8. A method according to claim 1 wherein said class one node identifier portion comprises the least significant bits of said CAN identifier field.

* * * * *